Patented June 7, 1932

1,861,892

UNITED STATES PATENT OFFICE

SERGE WITTOUCK, OF PARIS, FRANCE, ASSIGNOR TO INTERNATIONAL INDUSTRIAL AND CHEMICAL COMPANY LIMITED, OF MONTREAL, QUEBEC, CANADA

PRODUCTION OF BARIUM OXYGEN COMPOUNDS

No Drawing. Application filed April 20, 1931, Serial No. 531,621, and in Germany February 17, 1930.

This invention relates to the manufacture of barium hydroxide or hydrated oxide in crystallized form and has for its object the provision of an improved process for the continuous production thereof.

The presence of a reducing agent, more especially carbon, as is known per se, favours the development of carbon monoxide in the combustion of barium carbonate containing in some cases silicic acid.

It is also known to calcine barium carbonate with silica or barium silicate, in order to obtain a polybasic barium silicate, to hydrolyze the latter, with formation of barium hydroxide and if desired re-utilize the residue of lixiviation in a cycle.

It has been found that by adopting certain measures before and during calcination of a mixture of barium carbonate with silicic acid or barium silicate, the yield of crystallized barium hydroxide can be considerably increased and the invention is based upon this observation.

The invention consists in a process for the continuous production of barium hydroxide or hydrate by calcining barium carbonate with silicic acid or barium silicate and subsequent hydrolysis, characterized by the addition of carbon before calcination.

The invention further consists in a process of the kind hereinafter more clearly set forth and claimed.

In operating as above and maintaining the reaction temperature, as desirable, at about 1200° C. there is then formed in the reducing atmosphere a polybasic barium silicate, the carbon being used up 1. $SiO_2 \cdot BaO + (n-1) \cdot BaCO_3 + (n-1(C=2(n-1)CO + SiO_2 \cdot nBaO$
2. $SiO_2 \cdot n(BaO) + 9(n-1)H_2O = SiO_2 \cdot BaO + (n-1) \cdot (Ba(OH)_2 \cdot 8H_2O)$ By way of illustration the following are examples the second of which embodies the present invention:—

*Example 1.*—A mixture of 100 kgs. mono-barium-silicate ($SiO_2BaO$) with 200 kgs. barium carbonate when heated in the rotary furnace to 1320° C. results in the formation of a clinker the weight of which is 287 kgs. After treatment with hot water (at a temperature of about 65° C.) this clinker yields on the one hand a solid residue, containing mono-barium-silicate ($SiO_2BaO$) and a small quantity of barium carbonate ($BaCO_3$) which has not taken part in the reaction, and on the other hand a solution, from which 143,5 kgs. barium hydroxide ($Ba(OH)_2 + 8H_2O$), i. e., about 50 per cent. of the clinker product, are extracted.

*Example 2.*—20 kgs. pulverulent carbon, containing 12 kgs. fixed carbon, are added to the above mentioned mixture, of 100 kgs. mono-barium-silicate ($SiO_2BaO$) and 200 kgs. barium carbonate ($BaCO_3$). By calcination at a temperature not exceeding 1500° C. there is obtained 262 kgs. of a clinker which corresponds approximately to the formula $SiO_2 \cdot 3BaO$. This clinker, after lixiviation with hot water, gives 213 kgs. barium hydrate ($Ba(OH)_2$), i. e., an enhanced yield of approximately 80 per cent.

Since the carbon supplied according to the invention carries with it into the mixture a certain amount of silica it may be necessary, if analysis shows too high a content of this compound, to remove the same. It is however necessary in such a case to guard against a loss of barium also. With these ends in view the spent mass, i. e., the calcined and hydrogenized mass which contains barium silicate, is treated with a solution of an alkali carbonate and carbonic acid, in which case silicic acid gel is formed accordingly to the equation $BaSiO_3 + CO_2 = BaCO_3 + SiO_2$. This operation is conveniently conducted by first associating an alkali carbonate solution with the spent mass and thereupon streaming carbon dioxide through the mixture. Thereupon the mass is treated under heating with a caustic alkali solution in sufficient quantity to remove the excess silicic acid as soluble alkali silicate. After decanting and/or filtering the insoluble mass is brought into reaction again by the addition of barium carbonate and carbon and then calcined again and so on.

Having now described my invention, what I claim as new and desire to secure by Letters Patent is:—

1. A process for the continuous production of barium hydroxide or hydrate by calcining a mixture comprising carbon, barium carbonate and one of the materials selected from the group consisting of silicic acid and barium silicate, and hydrolizing the smelt.

2. A process according to claim 1 wherein the calcination is effected at temperatures of the order of 1200° C. and not exceeding 1500° C.

3. A process as claimed in claim 1 according to which silica introduced with the carbon is removed by adding an alkali carbonate solution to the spent mass, and then streaming carbon dioxide through same, whereupon the carbonized mass is treated while being heated with caustic alkali solution, to remove the excess silica as soluble alkali silicate, which is then separated by filtration and decanting from the insoluble part.

4. A cyclic process according to claim 1, wherein the insoluble residue freed of excess silica is re-utilized with suitable additions as starting material.

In testimony whereof I have signed my name to this specification.

SERGE WITTOUCK.